(12) United States Patent
Gebara

(10) Patent No.: US 6,498,523 B1
(45) Date of Patent: Dec. 24, 2002

(54) CIRCUIT FOR POWERING UP A MICROPROCESSOR

(75) Inventor: Ghassan R. Gebara, Spring, TX (US)

(73) Assignee: Compaq Information Technologies Group, L.P., Houston, TX (US)

( * ) Notice: Subject to any disclaimer, the term of this patent is extended or adjusted under 35 U.S.C. 154(b) by 0 days.

(21) Appl. No.: 08/883,615

(22) Filed: Jun. 26, 1997

Related U.S. Application Data

(63) Continuation of application No. 08/545,524, filed on Oct. 19, 1995, now abandoned.

(51) Int. Cl.[7] .................................................. H03K 17/22
(52) U.S. Cl. ........................................ 327/143; 327/198
(58) Field of Search ................................. 327/143, 198

(56) References Cited

U.S. PATENT DOCUMENTS

| | | | | |
|---|---|---|---|---|
| 4,385,243 A | * | 5/1983 | Suzuki | 327/143 |
| 4,446,381 A | * | 5/1984 | Dalrymple | 327/143 |
| 4,591,745 A | * | 5/1986 | Shen | 327/143 |
| 5,302,861 A | * | 4/1994 | Jelinek | 327/143 |
| 5,483,187 A | * | 1/1996 | Jang | 327/143 |
| 5,565,807 A | * | 10/1996 | Ward | 327/143 |

FOREIGN PATENT DOCUMENTS

| | | | |
|---|---|---|---|
| JP | 46-42646 | * | 12/1971 |
| JP | 55-47727 | * | 4/1980 |
| JP | 6-120790 | * | 4/1994 |

OTHER PUBLICATIONS

Intel®Pentium® Pro Family Developer's Manual vol. 1: Specification, p. 11–11, Jan. 1996.

* cited by examiner

Primary Examiner—Terry D. Cunningham
(74) Attorney, Agent, or Firm—Akin Gump Strauss Hauer & Feld LLP

(57) ABSTRACT

A circuit for generating a double-edged POWERGOOD signal to a P6 processor after power-up. After a power supply circuit asserts a signal which indicates that computer system power supply voltages are stable and within threshold levels, the circuit drives the POWERGOOD signal high. A first period later, the circuit drives the POWERGOOD signal back low. The POWERGOOD signal is maintained low for a second predetermined period. Finally, the circuit drives the POWERGOOD signal back high again, and the POWERGOOD signal is maintained high for as long as the power supply circuit indicates that computer system power supply voltages are stable.

4 Claims, 2 Drawing Sheets

CIRCUIT FOR POWERING UP A MICROPROCESSOR

This is a continuation of application Ser. No. 08/545,524 filed on Oct. 19, 1995, now abandoned.

BACKGROUND OF THE INVENTION

1. Field of the Invention

The invention relates to microprocessors, and more particularly, to a circuit for properly powering up a microprocessor in a computer system.

2. Description of the Related Art

Over the past several years, the performance of microprocessors has improved at a rapid rate. The different generations of the 80×86 processors from Intel Corporation provide an example of how the performances and capabilities of microprocessors have improved from one generation to the next. For example, the 80486 family of processors include many features that did not exist in the 80386 family of processors. The 80486 processor includes a local or internal cache memory, internal floating point unit, and other on-chip functions to provide for higher integration. The next generation of processors from Intel was the Pentium P5 family of processors, which contained several enhancements over the 80486 processors. These enhancements include an internal floating point unit which implemented faster algorithms, internal code and data caches, increased data bus width to improve data transfer rates, and bus cycle pipelining. In addition, the P5 processors are manufactured with more advanced processing technology, which allows them to operate at higher frequencies than prior generation processors.

The most recent generation of microprocessors from Intel is the P6 family of processors. Among the enhancements offered by the P6 family of processors is an integrated second level cache in addition to the first level cache. This further improves computer system performance. In addition, using an integrated second level cache reduces the overall system board size as separate cache controllers and cache memory devices are not needed for a second level cache.

However, Intel's P6 processor is not without its problems. At least one version of the P6 processor experiences problems when it is power cycled. If power is turned on to the P6 processor and then turned off for about 30 to 40 seconds, the P6 processor does not appear to come out of reset when power is again restored. Typically, power on a computer system board is cycled to test the behavior of the board. Because of the power-cycling problem experienced by the P6 processors, computer system board manufacturers are unable to test their boards properly.

It is therefore desired that a solution be identified to fix the power-up problem being experienced by the P6 processor.

SUMMARY OF THE PRESENT INVENTION

To overcome the problem discussed above, a circuit according to the present invention generates a double-edged power-good indication signal to the P6 microprocessor in a computer system. After a power supply circuit indicates that the power supply voltages have stabilized and are within tolerance limits, the circuit according to the present invention asserts the power-good indication signal. A first predetermined period later, the power-good indication signal is deasserted. The power-good indication signal remains deasserted for a second predetermined period. Next, the power-good indication signal is reasserted and is maintained asserted until the power supply circuit removes its indication that the power supply voltages are stable and within threshold levels. The two rising edges of the power-good indication signal allows the P6 microprocessor to power up properly after it is power cycled.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

Figure 1:
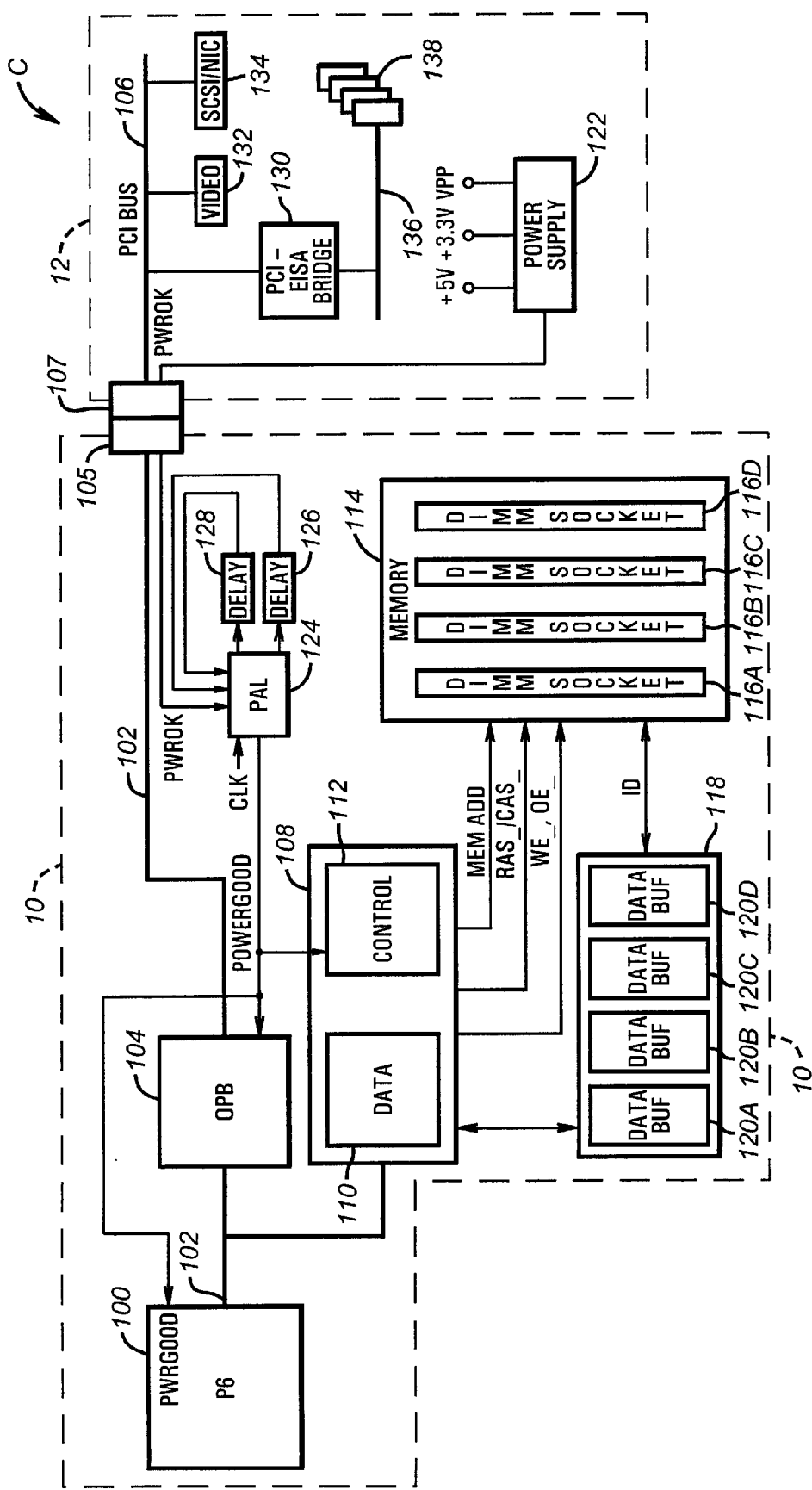
FIG. 1 is a block diagram of a computer system that incorporates a circuit according to the present invention.

Referring to FIG. 1, a block diagram of a CPU board 10 for connection to a system board 12 in a computer system C is shown. The CPU board 10 includes a P6 processor 100 which is connected to a processor bus 102. The processor bus 102 includes data, address and control portions. The processor bus 102 is connected to a processor-PCI bridge 104, which performs the necessary interface functions between the processor bus 102 and the PCI bus 106 located on the system board 12. The processor-PCI bridge 104 is connected to the PCI bus 106 through connectors 105 and 107.

The system board 12 includes the PCI bus 106 and either an ISA or EISA expansion bus 136, as well as a PCI-EISA bridge 130 to control cycles between the PCI bus 106 and EISA or ISA bus 136. Components connected to the PCI bus 106 include a video controller 132 and a SCSI and network interface card 134. The expansion bus 136 includes expansion slots 138 for receiving I/O expansion boards.

On the CPU board 10, the processor bus 102 is further connected to a memory controller 108, which includes a data portion 110 and a control portion 112. The control portion 112 provides the necessary control signals to main memory 114, which is preferably implemented with dynamic random access memories (DRAMs). In the preferred embodiment, the main memory 114 has a storage capacity of 512 Megabytes (MB) and is configurable up to a maximum of 2 Gigabytes. The various control signals provided by the control portion 112 to the memory 114 include the memory address, the RAS_ and CAS_row and column address strobe signals, the write enable signal WE_, and the output enable signal OE_. In the present description, signal names followed by the character "_" or "*" indicate that the signals are active low.

The main memory 114 receives memory boards via four DIMM or double in-line memory module sockets 116A–D. The memory data bus ID, which is 72 bits wide, is connected between the main memory 114 and read and write ahead buffer logic 118. The read and write ahead buffer logic 118 includes four data buffer portions 120A–D, which correspond to DIMM sockets 116A–D, respectively. The read and write ahead data buffer logic 118 is connected to the data portion 110 of the memory controller 108. The data portion 110 provides the necessary control signals to the read and write ahead buffer logic 118 and acts as a data buffer between the P6 processor 100 and the data buffers 120A–D.

A power supply circuit 122 is located on the system board 12, which provides voltage signals +5V, +3.3V and VPP (which is the voltage necessary for programming various EEPROMs located on the system board 12) and Vccp (processor core voltage). The power supply 122 also provides a signal PWROK, which indicates when the voltage signals +5V, +3.3V, VPP, and Vccp are stabilized and within predefined threshold levels after power up. The signal PWROK is provided to the CPU board 10 through the connectors 105 and 107. Once the power supply voltage signals are stabilized and within the threshold levels, the signal PWROK is asserted and maintained high. However, as discussed in the background of the present application, the P6 processor 100 does not power up properly after it has been powered cycled, particularly when the power-off duration is from about 30 to 40 seconds.

To overcome the limitation of the P6 processor 100, the preferred embodiment of the present invention uses a programmable array logic (PAL) chip 124 and associated delay logic 126 and 128, which are located on the CPU board 10. The PAL 124 receives the signal PWROK from the power supply circuit 122 through connectors 105 and 107 and generates a signal POWERGOOD. The signal POWERGOOD is provided to the processor 100, the processor-PCI bridge 104 and the control portion 112 of the memory controller 108.

The processor 100 includes an input signal pin PWRGOOD, which is asserted high to indicate to the processor 100 when power supply voltages are stable and within threshold levels. After the input pin PWRGOOD is asserted, the RESET* input pin to the processor 100 must be asserted for about 1 millisecond. The input pin PWRGOOD of the processor 100 is connected to the signal POWERGOOD generated by the PAL 124.

Figure 2:
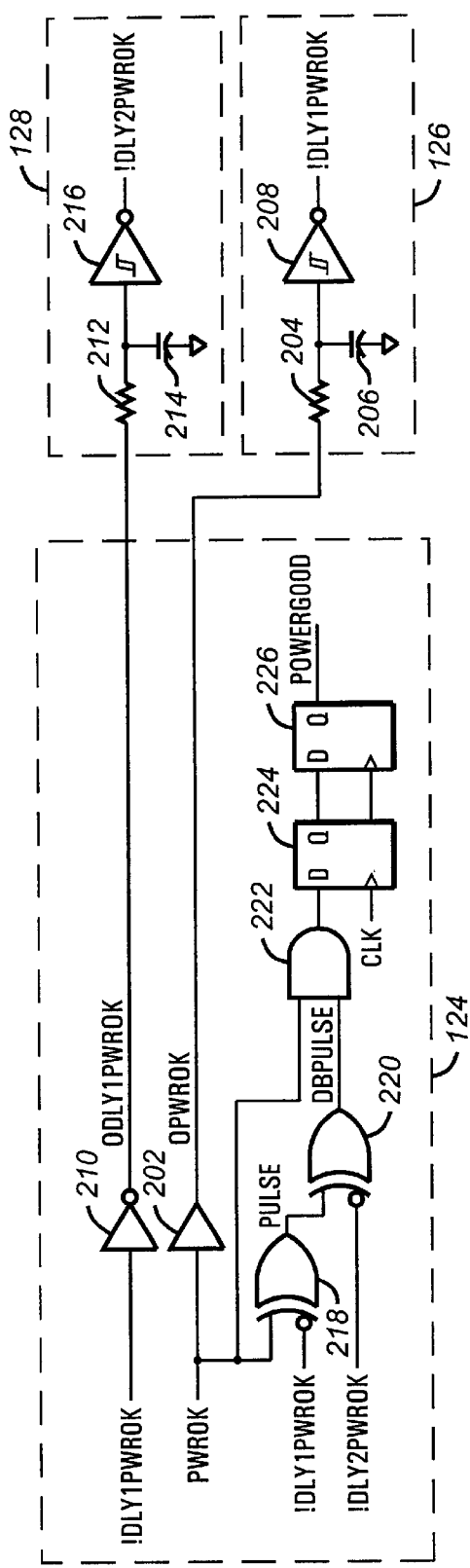
FIG. 2 is a schematic diagram of a circuit according to the present invention used in the computer system of FIG. 1.

Referring to FIG. 2, a schematic diagram is shown of the PAL 124 and associated delay logic 126 and 128. The logic in FIG. 2 is described in conjunction with FIG. 3, which illustrates a timing diagram of relevant signals generated by the PAL 124 and associated delay logic 126 and 128.

The signal PWROK is provided to the input of a buffer 202, whose output drives a signal OPWROK. The signal OPWROK is connected to one side of a resistor 204 in the delay logic 126. The other side of the resistor 204 is connected to one side of a capacitor 206 and to the input of an inverter 208. The other side of the capacitor 206 is connected to ground. The resistor 204 and the capacitor 206 form an RC network to provide a delay of the signal OPWROK. To prevent oscillation in the inverter 208 due to the relatively slow rise and fall times at the output node of the RC circuit, the inverter 208 is characterized by hysteresis. The inverter 208 can be any one of standard hysteresis-type inverters which are commercially available.

The output of the inverter 208 drives a signal !DLYLPWROK. The symbol "!" indicates that the signal is inverted. The signal !DLY1PWROK is fed back to the input of an inverter 210 in the PAL 124. The output of the inverter 210 drives a signal ODLY1PWROK, which is provided to one side of a resistor 212 in the delay logic 128. The other side of the resistor 212 is connected to one side of a capacitor 214 and to the input of an inverter 216. The value of the resistor 212 is preferably the same as the value of the resistor 204. Similarly, the value of the capacitor 214 is preferably the same as the capacitor 206. The inverter 216 is also a hysteresis-type inverter. The output of the inverter 216 drives a signal !DLY2PWROK, which is provided back to the PAL 124.

The PAL 124 includes an exclusive OR gate 218, which receives at its input the signal PWROK and the inverted state of the signal !DLYLPWROK. The output of the exclusive OR gate 218 drives a signal PULSE, which is provided to one input of an exclusive OR gate 220.

The other input of the exclusive OR gate 220 receives the inverted state of the signal !DLY2PWROK. The output of the exclusive OR gate 220 drives a signal DBPULSE, which is provided to one input of a two-input AND gate 222. The other input of the AND gate 222 receives the signal PWROK, and its output drives the D input of a D-type flip-flop 224. The non-inverting output of the flip-flop 224 is provided to the D input of a D-type flip-flop 226, whose non-inverting output provides the signal POWERGOOD. The clock input of the flip-flops 224 and 226 both receive a signal CLK, which is the P6 system bus clock running at a frequency of preferably 66.66 MHz.

Figure 3:
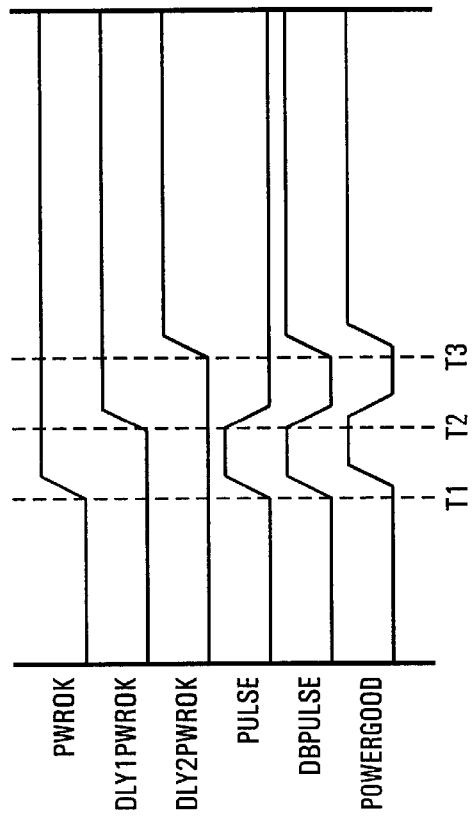
FIG. 3 is a timing diagram of signals illustrative of operation of the circuit of FIG. 2.

The timing diagram in FIG. 3 illustrates signals PWROK, DLY1PWROK, DLY2PWROK, PULSE, DBPULSE, and POWERGOOD formed in the manner described above. The signals DLYLPWROK and DLY2PWROK as illustrated are inverted from signals !DLYLPWROK and !DLY2PWROK, respectively. At time T1, the signal PWROK is asserted high by the power supply circuit 122 to indicate that the power supply voltage signals are stable. When the signal PWROK is asserted high, the signal PULSE is driven high by the exclusive OR gate 218. The rising edge of the signal PULSE in turn causes the exclusive OR gate 220 to drive the signal DBPULSE high.

At time T2, which is preferably approximately 3.3 milliseconds from time T1, the signal DLY1PWROK is asserted high. The delay between the rising edges of the signal PWROK and DLYLPWROK is provided by the resistor 204 and the capacitor 208.

When the signal DLYLPWROK rises, the signal PULSE falls low, which in turn causes the signal DBPULSE to fall low. The signal DLYLPWROK remains high after it is asserted high, and the signal PULSE remains low after it is driven low, for as long as the signal PWROK is maintained high.

At time T3, which is preferably approximately 3.3 milliseconds from time T2, the signal DLY2PWROK is asserted high. When that occurs, the exclusive OR gate 220 drives the signal DBPULSE high. The signal DBPULSE remains high after it is asserted high for as long as the signal PWROK is maintained high.

As shown, the signal POWERGOOD from flip-flop 226 tracks the state of the signal DBPULSE, except that the signal POWERGOOD is delayed by approximately two CLK periods with respect to the signal DBPULSE. The waveform of the signal POWERGOOD thus includes two rising edges in response to the assertion of the signal PWROK. The double-edged POWERGOOD signal ensures that the P6 processor 100 powers up properly, even after a power cycle with a power-off time of between 30 to 40 seconds.

The value of 3.3 milliseconds used for the delay between time T1 and time T2 and between time T2 and time T3 is a preferred value based on the values of commercially-available resistors and capacitors.

Alternatively, the delays between time T1 and time T2 and between time T2 and time T3 can be greater than 1 millisecond.

While the preferred embodiment shows that delay logic 126 and 128 are used in conjunction with the PAL 124 to generate the desired double-edged POWERGOOD signal, a similar waveform can be generated using counters and appropriate associated logic. The counters can be used to count the desired pulse high and low durations of the POWERGOOD signal.

Thus, a circuit has been described which generates a double-edged POWERGOOD signal to a P6 processor after power-up. After the power supply circuit asserts a signal which indicates that the computer system power supply voltages are stable and within threshold levels, the circuit drives the POWERGOOD signal high for a first predetermined period, drives the POWERGOOD signal back low for a second predetermined period, and finally drives the POWERGOOD signal back high again. In response to the two rising edges of the POWERGOOD signal, the P6 processor powers up properly after it is power cycled.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

In the claims:

1. A computer system, comprising:

a microprocessor having a power-good input pin;

a power supply that provides a first signal indicating when power supply voltages are stable; and means responsive to said first signal for generating a second signal, said second signal being connected to said microprocessor power-good input pin, and said second signal generating means asserting said second signal in response to said first signal being asserted, deasserting said second signal a first period after said second signal is asserted, and reasserting said second signal a second period after said second signal is deasserted, wherein said microprocessor powers up in response to the reassertion of said second signal, wherein said generating means includes a first delay logic to determine said first period and a second delay logic to determine said second period and wherein each of said first delay logic and said second delay logic includes a resistor and capacitor connected to form an RC delay network.

2. A circuit for powering up a microprocessor in response to a first signal indicating that power supply voltages are stable, the microprocessor having a microprocessor power-good input pin, the circuit comprising:

means for generating a second signal that is connected to the microprocessor power-good input pin; and means responsive to the first signal and coupled to said generating means for controlling said second signal generating means, wherein said generating means asserts said second signal in response to the first signal being asserted, deasserts said second signal a first period after said second signal is asserted, and reasserts said second signal a second period after said second signal is deasserted, wherein the reassertion of said second signal powers up the microprocessor, wherein said controlling means includes a first delay logic to determine said first period and a second delay logic to determine said second period and wherein each of said first delay logic and said second delay logic includes a resistor and a capacitor connected to form a RC delay network.

3. A computer system, comprising:

a microprocessor having a power-good input pin;

a power supply that provides a first signal indicating when power supply voltages are stable; and signal generator responsive to said first signal generating a second signal, said second signal being connected to said microprocessor power-good input pin, and said signal generator asserting said second signal in response to said first signal being asserted, deasserting said second signal a first period after said second signal is asserted, and reasserting said second signal a second period after said second signal is deasserted, wherein said microprocessor powers up and responds to the reassertion of said second signal, wherein said signal generator includes a first delay logic to determine said first period and a second delay logic to determine said second period and wherein each of said first delay logic and said second delay logic includes a resistor and capacitor connected to form an RC delay network.

4. A circuit for powering up a microprocessor in response to a first signal indicating tat power supply voltages are stable, the microprocessor having a microprocessor power-good input pin, the circuit comprising:

signal generator generating a second signal that is connected to the microprocessor power-good input pin; and signal generating controller responsive to the first signal and coupled to said signal generator controlling said signal generator, wherein said signal generator asserts said second signal in response to the first signal being asserted, deasserts said second signal a first period after said second signal is asserted, and reasserts said second signal a second period after said second signal is deasserted, wherein the reassertion of said second signal powers up the microprocessor, wherein said signal generating controller includes a first delay logic to determine said first period and a second delay logic to determine said second period and wherein each of said first delay logic and said second delay logic includes a resistor and a capacitor connected to form a RC delay network.

* * * * *